US011308525B2

(12) United States Patent
Demsey et al.

(10) Patent No.: US 11,308,525 B2
(45) Date of Patent: *Apr. 19, 2022

(54) SYSTEMS AND METHODS FOR AUGMENTING REAL-TIME ELECTRONIC BIDDING DATA WITH AUXILIARY ELECTRONIC DATA

(71) Applicant: Verizon Media Inc., New York, NY (US)

(72) Inventors: Seth Mitchell Demsey, Dulles, VA (US); Matthew M. Patton, Baltimore, MD (US)

(73) Assignee: Yahoo Ad Tech LLC, New York, NY (US)

(*) Notice: Subject to any disclaimer, the term of this patent is extended or adjusted under 35 U.S.C. 154(b) by 127 days.

This patent is subject to a terminal disclaimer.

(21) Appl. No.: 16/578,801

(22) Filed: Sep. 23, 2019

(65) Prior Publication Data

US 2020/0019997 A1 Jan. 16, 2020

Related U.S. Application Data

(63) Continuation of application No. 14/969,173, filed on Dec. 15, 2015, now Pat. No. 10,460,355.

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0277* (2013.01)

(58) Field of Classification Search
None
See application file for complete search history.

(56) References Cited

U.S. PATENT DOCUMENTS 8,275,659 B2 * 9/2012 Ellis .................. A63F 13/61
705/14.41
8,328,640 B2 * 12/2012 Rom .................. G07F 17/3227
463/42

(Continued)

FOREIGN PATENT DOCUMENTS

JP 2002140610 A * 5/2002 ............. G06F 17/60
JP 2002251541 A * 9/2002 ............. G06F 17/60

(Continued)

OTHER PUBLICATIONS

Chen, Ye. Real-Time Bidding Algorithms for Performance-Based Display Ad Allocation. 2011. Retrieved online Jun. 29, 2019. http://www0.cs.ucl.ac.uk/staff/w.zhang/rtb-papers/rtb-perf-bid.pdf(Year: 2011).*

(Continued)

*Primary Examiner* — James A Reagan
(74) *Attorney, Agent, or Firm* — Bookoff McAndrews, PLLC

(57) ABSTRACT

Systems, methods, and computer-readable media are disclosed for augmenting real-time bidding data with proprietary data. One method includes: receiving, at a server over an electronic communications network from a real-time impression bidder, a bid request or a request to augment a bid request with proprietary data; accessing, by the server from an internal database, proprietary data of a data augmenting service based on a user identifier of the bid request; determining, by the server, proprietary data to include in an augmented bid request based on at least one of the received bid request and the user identifier; formatting, by the server, the augmented bid request into a standardized, augmented bid request; and transmitting, by the server over the electronic communications network, the standardized, augmented bid request to the real-time impression bidder.

20 Claims, 4 Drawing Sheets

(56) References Cited

U.S. PATENT DOCUMENTS

| | | | | |
|---|---|---|---|---|
| 9,483,780 | B2* | 11/2016 | Xiong | G06Q 30/0277 |
| 10,217,117 | B2* | 2/2019 | Heath | G06Q 30/06 |
| 10,460,355 | B1* | 10/2019 | Demsey | G06Q 30/0277 |
| 2004/0128224 | A1* | 7/2004 | Dabney | G06Q 30/08 |
| | | | | 705/37 |
| 2006/0212350 | A1* | 9/2006 | Ellis | G06Q 30/0269 |
| | | | | 705/14.41 |
| 2006/0282327 | A1* | 12/2006 | Neal | H04N 21/222 |
| | | | | 705/14.53 |
| 2008/0214148 | A1* | 9/2008 | Ramer | G06F 16/635 |
| | | | | 455/414.1 |
| 2009/0024737 | A1* | 1/2009 | Goldspink | G06F 11/3495 |
| | | | | 709/224 |
| 2009/0163187 | A1* | 6/2009 | Terrell, II | G06Q 30/02 |
| | | | | 455/414.2 |
| 2010/0057536 | A1* | 3/2010 | Stefik | G06Q 30/0277 |
| | | | | 705/14.71 |
| 2010/0064234 | A1* | 3/2010 | Schreiber | G06F 9/454 |
| | | | | 715/760 |
| 2010/0299434 | A1* | 11/2010 | Hanson | G06Q 30/02 |
| | | | | 709/224 |
| 2010/0306249 | A1* | 12/2010 | Hill | G06Q 50/01 |
| | | | | 707/769 |
| 2011/0041168 | A1* | 2/2011 | Murray | H04L 67/306 |
| | | | | 726/7 |
| 2011/0066497 | A1* | 3/2011 | Gopinath | G06Q 30/0255 |
| | | | | 705/14.53 |
| 2011/0246305 | A1* | 10/2011 | Brazeau | G06Q 30/0261 |
| | | | | 705/14.58 |
| 2011/0264516 | A1* | 10/2011 | Lang | G06Q 30/02 |
| | | | | 705/14.46 |
| 2011/0270701 | A1* | 11/2011 | Black | G06Q 30/06 |
| | | | | 705/26.3 |
| 2012/0036015 | A1* | 2/2012 | Sheikh | G06Q 30/0261 |
| | | | | 705/14.54 |
| 2012/0036023 | A1* | 2/2012 | Das | G06Q 30/02 |
| | | | | 705/14.71 |
| 2012/0143674 | A1* | 6/2012 | Ziskrout | G06Q 30/0244 |
| | | | | 705/14.43 |
| 2012/0310729 | A1* | 12/2012 | Dalto | G06Q 30/02 |
| | | | | 705/14.43 |
| 2014/0222618 | A1* | 8/2014 | Stamp | G06Q 30/0611 |
| | | | | 705/26.35 |
| 2014/0244387 | A1* | 8/2014 | Patton | G06Q 30/0269 |
| | | | | 705/14.53 |
| 2014/0279052 | A1* | 9/2014 | Demsey | G06Q 30/08 |
| | | | | 705/14.71 |
| 2014/0279056 | A1* | 9/2014 | Sullivan | G06Q 30/0275 |
| | | | | 705/14.71 |
| 2015/0073909 | A1* | 3/2015 | Peden | G06Q 30/0276 |
| | | | | 705/14.58 |
| 2015/0278876 | A1* | 10/2015 | Xiong | G06Q 30/0277 |
| | | | | 705/14.71 |
| 2021/0201392 | A1* | 7/2021 | Aghdaii | G06Q 30/0276 |

FOREIGN PATENT DOCUMENTS

| | | | | | |
|---|---|---|---|---|---|
| JP | 2012146274 | A | * | 8/2012 | G06Q 30/08 |
| JP | 2012146274 | A | | 8/2012 | |
| JP | 2015097094 | A | * | 5/2015 | G06Q 30/0273 |
| WO | WO-2007100840 | A2 | * | 9/2007 | G06Q 30/00 |
| WO | 2007100840 | A3 | | 2/2008 | |

OTHER PUBLICATIONS

Google Support. Optimize your bidding with viewability data. (Oct. 31, 2014). Retrieved online Dec. 2, 2021. https://support.google.com/authorizedbuyers/answer/6123619?hl=en (Year: 2014).*

Alexey Reznichenko. Private-By-Design Advertising and Analytics: From Theory to Practice. (Jun. 16, 2014). Retrieved online Dec. 12, 2021. https://www.mpi-sws.org/tr/2014-005.pdf (Year: 2014).*

James Manyika et al. Open data: Unlocking innovation and performance with liquid information. (Oct. 2013). Retrieved online Dec. 12, 2021. ttps://www.mckinsey.com/~/media/mckinsey/business%20functions/mckinsey%20digital/our%20insights/open%20data%20unlocking%20innovation%20and%20performance%20with%20liq (Year: 2013).*

Chen, Ye. Real-Time Bidding Algorithms for Performance-Based Display Ad Allocation. 2011. Retrieved online Jun. 29, 2019. http://www.cs.ucl.ac.uk/staff/w.zhang/rtb-papers/rtb-perf-bid.pdf.

* cited by examiner

SYSTEMS AND METHODS FOR AUGMENTING REAL-TIME ELECTRONIC BIDDING DATA WITH AUXILIARY ELECTRONIC DATA

CROSS-REFERENCE TO RELATED APPLICATION(S)

This patent application is a continuation of and claims the benefit of priority to U.S. patent application Ser. No. 14/969,173, filed on Dec. 15, 2015, the entirety of which is incorporated herein by reference.

TECHNICAL FIELD

Various embodiments of the present disclosure relate generally to augmenting real-time electronic bidding data with auxiliary electronic data, and more specifically, to augmenting a real-time bid request with proprietary data in order to improve responses to an online advertising auction.

BACKGROUND

Companies, universities, governments, and other operators of network services own or generate proprietary data from various of their respective online systems. This proprietary data may include online advertising data and other forms of user data. User data is a valuable commodity in the online marketing field. This user data, however, is not easily traded or shared between the owners and users of the data. Data owners may want to control the use of their proprietary data, and may want to ensure that the proprietary data is securely shared. However, data owners have not been able to ensure the integrity of their proprietary data when shared under conventional methods and systems. Further, due to privacy concerns, a data owner may not be able to share their proprietary data because it may contain particular identifiable user data, to which the data owner may wish to restrict access. Traditionally, data owners have not been able to share their proprietary data in a way that ensures such information is securely shared among parties.

In an online advertising marketplace, a bidder for an online advertising space wishes to have more and accurate information about an advertising space and viewers thereof prior to purchasing the space. More and accurate data leads to higher bids for quality advertising spaces, which leads to more efficient bidding, and ultimately the best possible monetize-able online content. While there are repositories of such data, the sources of this proprietary data exist in disjoint sectors of the industry. Further, although strides have been made to chip away at these walls, there remains the problem of streamlining this proprietary into an auction for an advertising space.

A significant percentage of online advertising spaces are purchased via real-time bidding Exchanges ("RTBx"). These exchanges integrate with different bidding entities, usually Demand Side Platforms ("DSP") or advertising networks. Each time an impression is up for bid, the RTBx transmits a request for a bid to each bidder. The bid request may include a set of data-points describing the impression, such as a Uniform Resource Locator ("URL"), geo location, size of the ad, etc.

Accordingly, a need exists for systems and methods for using proprietary data, such as in the use of an online advertising auction, and sharing such data in a secure manner. More specifically, a need exists for systems and methods for allowing a more liquid marketplace in the secure trading and secure sharing of proprietary data, and allowing the use of proprietary data to augment a real-time bid request.

SUMMARY OF THE DISCLOSURE

Systems, methods, and computer-readable media are disclosed for augmenting real-time bidding data with proprietary data.

Computer-implemented methods for augmentation of real-time bidding data with proprietary data are disclosed. One method includes: receiving, at a server over an electronic communications network from a real-time impression bidder, a bid request or a request to augment a bid request with proprietary data; accessing, by the server from an internal database, proprietary data of a data augmenting service based on a user identifier of the bid request; determining, by the server, proprietary data to include in an augmented bid request based on at least one of the received bid request and the user identifier; formatting, by the server, the augmented bid request into a standardized, augmented bid request; and transmitting, by the server over the electronic communications network, the standardized, augmented bid request to the real-time impression bidder.

Systems for augmenting real-time bidding data with proprietary data are disclosed. One system includes a data storage device storing instructions for augmenting real-time bidding data with proprietary data; and a processor configured to execute the instructions to perform a method for augmenting real-time bidding data with proprietary data, the method including: receiving over an electronic communications network from a real-time impression bidder, a bid request or a request to augment a bid request with proprietary data; accessing, from an internal database, proprietary data of a data augmenting service based on a user identifier of the bid request; determining proprietary data to include in an augmented bid request based on at least one of the received bid request and the user identifier formatting the augmented bid request into a standardized, augmented bid request; and transmitting, over the electronic communications network, the standardized, augmented bid request to the real-time impression bidder.

Non-transitory computer-readable media storing instructions that, when executed by a computer, cause the computer to perform a method for augmenting real-time bidding data with proprietary data are disclosed. One method includes: receiving, at a server over an electronic communications network from a real-time impression bidder, a bid request or a request to augment a bid request with proprietary data; accessing, by the server from an internal database, proprietary data of a data augmenting service based on a user identifier of the bid request; determining, by the server, proprietary data to include in an augmented bid request based on at least one of the received bid request and the user identifier; formatting, by the server, the augmented bid request into a standardized, augmented bid request; and transmitting, by the server over the electronic communications network, the standardized, augmented bid request to the real-time impression bidder.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
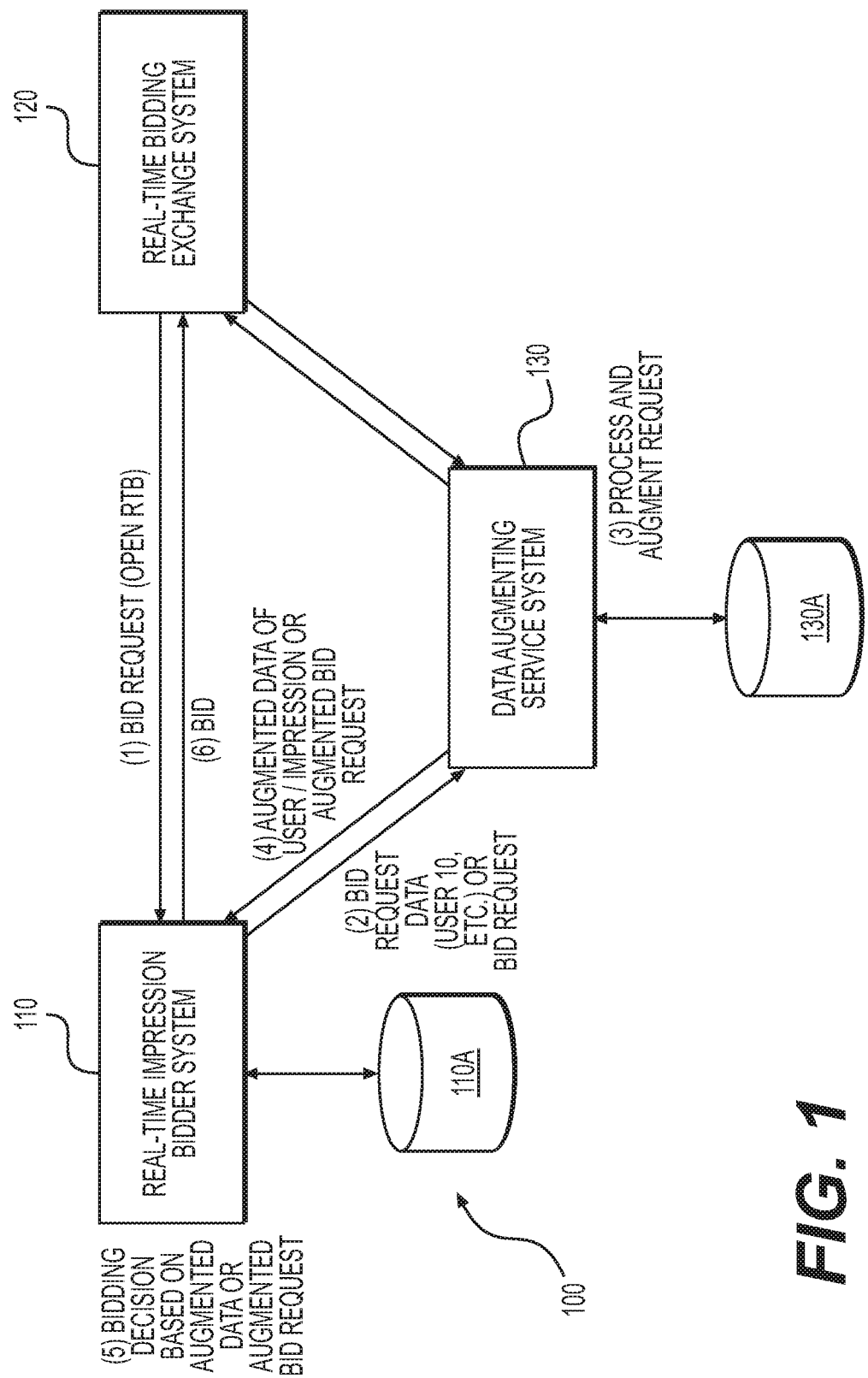
FIG. 1 depicts an online environment for augmenting real-time bidding data with third-party proprietary data, according to embodiments of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

In one embodiment of the disclosure, systems and methods are described that enable the augmenting real-time bidding data with third-party proprietary data, such as online advertising data. The proprietary data may be generated and/or stored by one or more user data providing services including data brokers, Internet advertisers, data management platform ("DMP") services, and/or any other industry that generates and/or stores proprietary user data. These data providing services, also referred to as data augmenting services, may acquire, generate, store, and/or use vast amounts of proprietary data that relates to users, such as Internet users who view and interact with online advertisements. The data providing services may wish to sell, lease, and/or share its proprietary data with real-time impression bidders of online advertisement auctions within a real-time bidding exchange in order to allow the real-time impression bidder to improve their bids based on the data of the bid request and the augmented data.

The present disclosure provides an additional layer in between the real-time bidding exchange and real-time impression bidders by allowing data providers to augment the standard data reported by the real-time bidding exchange on each bid request. The additional layer also allows a real-time bidding exchange to integrate third-party data sources to provide richer-data for the real-time impression bidders. Alternatively, or additionally, the additional layer may allow real-time impression bidders to integrate third-party proprietary data based on their own connections to third-party data sources (data providers).

The present disclosure allows for use of the standard protocol for communication between real-time bidding exchanges and real-time impression bidders, which is the Interactive Advertising Bureau ("IAB") OpenRTB protocol. Use of a standardized protocol allows for data to be passed to each real-time impression bidder regardless of the real-time bidding exchange in order to simplify real-time impression bidder integration with each real-time bidding exchange. OpenRTB protocol may organize the data of a bid request into objects, or categories, that describe the type of data being passed (i.e., publisher, content, device, geo, user, data, segment, etc.). The data and segment objects may allow real-time bidding exchanges to include data from third-party data sources in bid requests.

A real-time impression bidder may want access to user data in order to determine whether to buy an advertising space and/or to view/decide on their bids augmented with user data to more accurately target a user. A real-time impression bidder may access user data of a data augmenting service to provide real-time decision making for matching a user to a segment and/or matching a user to an advertising space. For example, with real-time bidding and real-time access to the user data of a data augmenting service, a real-time impression bidder may use the user data to make a bid or respond to a bid request. If the bid is accepted, the impression bidder's advertisement may be displayed to the user.

In order to control access to the proprietary data, the systems and methods disclosed herein may allow data augmenting services to restrict access to their proprietary data and/or to revoke access to their proprietary data remotely with or without communication with the real-time impression bidder. The systems and methods also may allow for the secure transmission of proprietary data from data augmenting services to the real-time impression bidders. These abilities may allow the data augmenting service to retain control options, and allow the data augmenting service to leverage the proprietary data in a "privacy-friendly" manner.

A real-time impression bidder that wishes to have access to the proprietary data may register with a digital rights management ("DRM") system. The DRM system may be a system operated by the data augmenting service and/or a third party. The DRM system may be used by one or more data augmenting services and/or real-time bidding exchanges to authenticate the real-time impression bidder and/or real-time bidding exchanges. The DRM system may be used to obtain a digital certificate for encryption and/or decryption of proprietary data and/or may be used to provide secure communication between the real-time impression bidder, real-time bidding exchanges, and the data augmenting service. Through the use of a DRM system, a data augmenting service may be able to maintain control of its proprietary data and securely encrypt the proprietary data to be transferred to the real-time impression bidder and/or real-time bidding exchange.

Once a real-time impression bidder has registered with the DRM system, the real-time impression bidder and/or real-time bidding exchange may send requests for proprietary data to the data augmenting service using the digital certificate. The proprietary data requested may then be processed, encrypted, and/or packaged to control the access to the proprietary data. The data augmenting service, through its server or through a connection to the DRM server, may process and encrypt the proprietary data. The data augmenting service may then have the encrypted proprietary data sent to the real-time impression bidder and/or real-time bidding exchanges and/or allow the real-time impression bidder and/or real-time bidding exchanges to access the encrypted proprietary data.

A real-time impression bidder may want access to the user-related data (proprietary data) of the data augmenting service in order to determine whether to buy an advertising space for targeting advertisements. The user-related data may provide more accuracy in determining whether to place a bid for an advertising space. Since the user-related data may be more specific than aggregated data, access to the data of the data augmenting service may be limited to one or more transactions and/or for a limited time period. For example, the data of the data augmenting service may only be made available to the real-time impression bidder for a single transaction by setting the service and privilege rights of the digital certificate to work for a single transaction. Additionally, and/or alternatively, the service and privilege rights of the digital certificate may be set to revoke access to the data augmenting service's data after a predetermined period of time.

If a certificate held/presented by a real-time impression bidder allows for access to user-related data for bidding and/or decision making, then the certificate of the data augmenting service may include settings with targeting parameters to pass into the system of the data augmenting service. The data augmenting service may then transmit encrypted data to the real-time impression bidder that contains the targeting parameters requested by the real-time impression bidder. The encrypted data may then be decrypted when the DRM system receives the encrypted data from the real-time impression bidder and authentication and/or permission from the data augmenting service to allow the decryption. A DRM system and/or the data augmenting service may remove the privilege and/or additional access to the encrypted data.

Another benefit of the present disclosure is that a real-time bidding exchange ("RTBx"), which sends and/or receives offers for advertisements to be provided on videos and/or web pages, may be able to use the user-related data of a data augmenting service in order to determine whether to accept a bid. The offers that a RTBx sends and/or receives may be bids at various bid rates depending on information provided by the RTBx. For example, if nothing is known about a web page, video, and/or a user viewing the web page and/or video, bid rates may be low. However, if more information is known about the web page, video, and/or the user, then the bid rates may be high. One or more data augmenting services may be used by the RTBx at a time before and/or during the bidding process to adjust the prices of prospective bids. The proprietary data may be collected from a data augmenting service, and may be used by the RTBx to enhance real-time bidding offers.

The proprietary data may increase the possibility of higher bid prices. For example, an advertiser may want to advertise to users that are interested in sports. Without the proprietary data in the bidding process, the bid prices may be low because the advertiser may not know anything about a user. However, if there were detailed information available for the particular user from the proprietary data, then the advertiser may bid a higher price because the advertiser may be able to determine that the user is interested in sports. Further, the RTBx may use the proprietary data to determine an initial bid price. For example, a RTBx may have an initial bid price for an offer to advertise to a user in a video and/or web page when no information is available, and the RTBx may have a relatively higher initial bid price for an offer to advertise to a user of a video and/or web page when detailed information is available from the proprietary data about the user. Higher bids may be obtained from an advertiser that wants to advertise to users that are interested in sports related advertisements.

A data augmenting service of the present disclosure may receive a real-time bidding request from one or both of a real-time impression bidder and/or a real-time bidding exchange. In one embodiment, the data augmenting service may receive data about a user and/or impression that is uncategorized, unclassified, not yet segmented, and/or has no associated user-related information. The data augmenting service may process the real-time bidding request, look up useable data related to the user of the real-time bidding request, and/or format a response to the real-time bidding request. The data augmenting service may determine specific information related to the user, such as a segment, category, and/or classification. Once the proprietary data has been determined about the user of the real-time bidding request, the augmentation service may transmit the augmented real-time bidding request back to the original transmitter. With the augmented real-time bidding request, the RTBx may place the augmented real-time bidding request back on the exchange and/or a different exchange at a higher price with additional information based on the proprietary data. Additionally, the real-time impression bidder may determine whether to respond to a bid request from the RTBx based on the augmented real-time bidding request.

FIG. 1 depicts an online environment 100 for augmenting real-time bidding data with third-party proprietary data, according to embodiments of the present disclosure. A shown in FIG. 1, the online augmenting advertising data environment 100 may generally include one or more real-time impression bidder systems 110, one or more real-time bidding exchange systems 120, and one or more data augmenting service systems 130. The real-time impression bidder systems 110 may receive, over an electronic communications network, such as the Internet, a bid request from a real-time bidding exchange ("RTBx") system 120 (at step 1). Alternatively, the real-time impression bidder system may obtain, over the electronic communications network, bid request data from the RTBx system 120.

Upon receiving the bid request, the real-time impression bidder system 110 may optionally determine whether to transmit the bid request data to a data augmenting service system 130 based on the bid request data received from RTBx system 120. For example, the real-time impression bidder system 110 may access an internal database 110A that stores proprietary data of the real-time impression bidder system 110. Based on the proprietary data stored in the internal database 110A and the bid request data, the real-time impression bidder system 110 may determine whether to respond to the bid request from the RTBx system 120. When the real-time impression bidder system 110 determines to respond to the bid request from the RTBx system 120, the real-time impression bidder system 110 may transmit at (step 2), over the communications network, the bid request data, along with its appended proprietary (if any) data, to the data augmenting service system 130.

The data augmenting service system 130 may receive, over the electronic communications network, the bid request data from the real-time impression bidder system 110 and/or from the RTBx system 120. The data augmenting service system 130 may access an internal database 130A that stores proprietary data of the data augmenting service system 130. Based on the proprietary data stored in the internal database 130A and the bid request data, the data augmenting service system 130 may determine at step 3 user-related data to include in the augmented bid request data.

After the data augmenting service system 130 determines user-related data to include in the augmented bid request data, the data augmenting service system 130 (at step 3) may also format the augmented bid request data into a standardized data format that may be understood by one or more of the real-time impression bidder systems 110 and/or the RTBx system 120. The standardized, augmented bid request may then be transmitted (at step 4) to the original transmitter of the bid request, such as the one or more of the real-time impression bidder system 110 and/or the RTBx system 120.

As discussed above, the real-time impression bidder system 110 (at step 5) may make a bidding decision based on the augmented data or the augmented bid request. Then, the real-time impression bidder system 110 (at step 6) may respond to the RTBx system 120.

One or more of the real-time impression bidder system 110, the RTBx system 120, and/or the data augmenting service system 130 may encrypt and/or decrypt the transmission sent and/or received to ensure that proprietary data remains private and/or secure.

Figure 2:
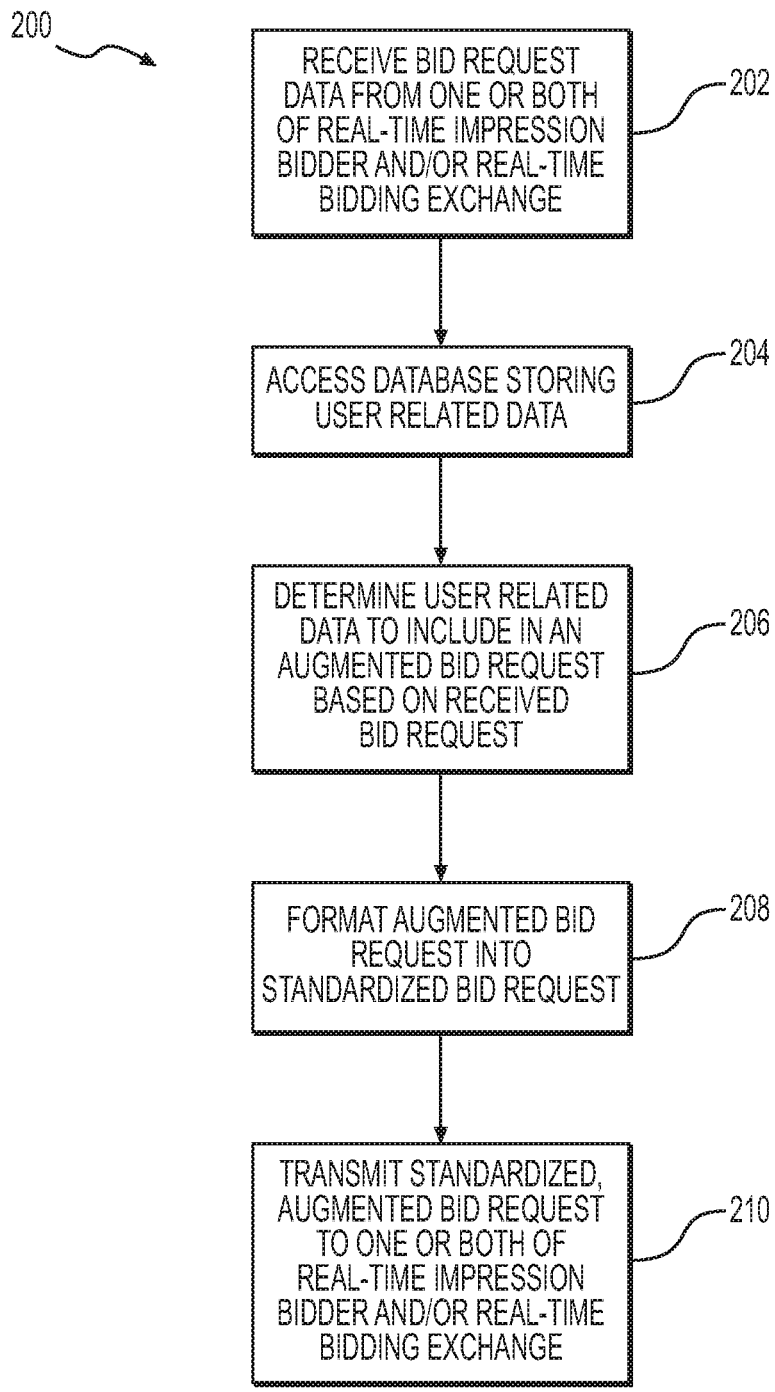
FIG. 2 is a flowchart describing a method for augmenting real-time bidding data with third-party proprietary data, according to embodiments of the present disclosure.

FIG. 2 is a flowchart describing a method for augmenting real-time bidding data with third-party proprietary data, according to embodiments of the present disclosure. As shown in the flowchart, a data augmenting service system, such as data augmenting service system 130, may receive at step 202 bid request data from one or both of a real-time impression bidder, such as real-time impression bidder system 110, and/or a real-time bidding exchange, such as RTBx system 120. The bid request may include a user identifier to be used to determine user-related data to include in a response by the data augmenting service. Additionally, if the bid request is received from a real-time impression bidder, then user data appended to the bid request may also be received by the data augmenting service. In one embodiment, the bid request may be encrypted, according to the techniques described above.

At step 204, the data augmenting service may access an internal database, such as database 130A, in which proprietary data is stored in association with a user identifier. Then, at step 206, the data augmenting service may determine user-related data to include in an augmented bid request based on the received bid request. For example, the data augmenting service may compare the user identifier to user identifiers stored in the internal database. When the received user identifier matches a user identifier stored in the internal database, the data augmenting service may determine which user-related data is to be included in the augmented bid request. The augmented bid request may include demographic information, segment information, and/or other user-related information.

At step 208, the data augmenting service may format the augmented bid request into a standardized, augmented bid request. For example, the bid request may be in a particular protocol and/or format, such as an interactive advertising bureau ("IAB") open real-time bidding protocol ("IAB OpenRTB protocol"). The data augmenting service may include the proprietary data from its internal database in a standardized format readable by one or more of the real-time impression bidder and/or the RTBx. The formatting may organize the proprietary data of the data augmenting service into objects and/or categories that describe the type of data being passed, such as a publisher, content, device, geographic region, user demographic information, segment data, and/or other types of data. After the augmented bid request has been formatted, at step 210, the data augmenting service may transmit the standardized, augmented bid request to the original transmitter of the bid request, such as one or more of the real-time impression bidder system 110 and/or the RTBx system 120.

Figure 3:
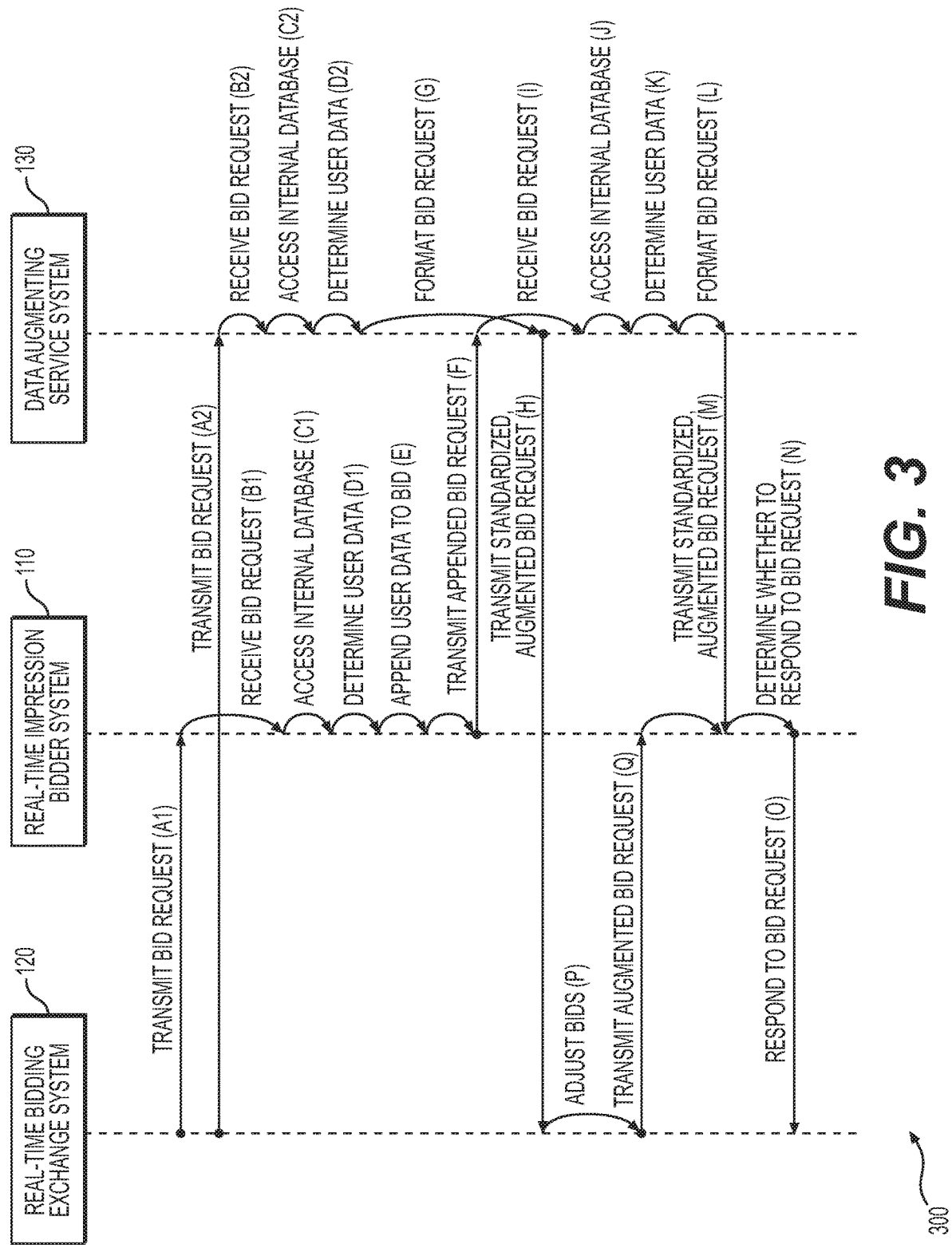
FIG. 3 depicts a flow diagram providing a method for augmenting real-time bidding data with third-party proprietary data, according to embodiments of the present disclosure.

FIG. 3 depicts a flow diagram 300 providing a method for augmenting real-time bidding data with third-party proprietary data, according to embodiments of the present disclosure. As shown in flow diagram 300, systems of various entities may be accessed and/or communicate in the process of augmenting real-time bidding data with third-party proprietary data. For example, flow diagram 300 of FIG. 3 includes a real-time bidding exchange system 120, a real-time impression bidder system 110, and a data augmenting service system 130.

Augmenting real-time bidding data may begin by real-time bidding exchange ("RTBx") 120 transmitting a bid request to one or more of a real-time impression bidder system 110 at (step A1) and/or a data augmenting service system 130 (at step A2). Steps A1 and A2 may concurrently or consecutively. Alternatively, step A1 may occur or step A2 may occur. For example, the RTBx may desire to receive as many bids as possible based upon the data it has for an advertising space, and proceed with transmitting the bid request to one or more real-time impression bidder systems 110. The RTBx may also desire to adjust and/or increase the cost of the advertising space by providing additional information, obtained from a data augmenting service, to real-time impression bidders.

At step B1, the real-time impression bidder system 110 may receive the bid request from the RTBx system 120. Then, at step C1, the real-time impression bidder system 110 may access an internal database, such as database 110A, in which proprietary data of the real-time impression bidder is stored. At step D1, the real-time impression bidder system 110 may determine user data that related to the bid request based on data included in the bid request. The real-time impression bidder system 110 may also optionally determine whether to respond to the bid request based on the determined user data and the received bid request. At step E, the real-time impression bidder system 110 may optional append determined user data to the bid quest for transmission to a data augmenting service. The appended user data may include a user identifier, uniform resource locator ("URL") data, geographic information, demographic information, advertisement information, etc. At step F, the real-time impression bidder system 110 may transmit the appended bid request to data augmenting service system 130.

At step B2, the data augmenting service system 130 may receive the bid request from the RTBx system 120. Then, at step C2, the data augmenting service system 130 may access an internal database, such as database 130A, in which proprietary data of the data augmenting service is stored. At step D3, the data augmenting service system 130 may determine user-related data to include in an augmented bid request based on the received bid request. At step G, the data augmenting service system 130 may format the augmented bid request into a standardized, augmented bid request. The standardized, augmented bid request may include a user identifier, uniform resource locator ("URL") data, geographic information, demographic information, etc. At step H, the data augmenting service system 130 may transmit the standardized, augmented bid request to the RTBx system 120. As mentioned above, steps A1, B1, C1, D1, E, and F and steps A2, B2, C2, D2, G, and H may occur concurrently, consecutively, or alternatively.

At step P, the RTBx system 120 may receive the standardized, augmented bid request from the data augmenting service system 130, and may adjust one or more bids, such as by adjusting a minimum bid price. Then at step Q, the RTBx system 120 may transmit the standardized, augmented bid request to one or more real-time impression bidder systems 110.

At step I, the data augmenting service system 130 may receive the bid request data from the real-time impression bidder system 110. The bid request may include a user identifier to be used to determine user-related data to include in a response by the data augmenting service. Additionally, user data of the real-time impression bidder system 110 may be appended to the bid request itself.

At step J, the data augmenting service system 130 may access an internal database, such as database 130A, in which proprietary data is stored in association with a user identifier. Then, at step K, the data augmenting service system 130 may determine user-related data to include in an augmented bid request based on the received bid request. For example, the data augmenting service may compare the user identifier to user identifiers stored in the internal database. When the received user identifier matches a user identifier stored in the internal database, the data augmenting service may determine which user-related data is to be included in the augmented bid request. The augmented bid request may include demographic information, segment information, and/or other user-related information. At step L, the data augmenting service system 130 may format the augmented bid request into a standardized, augmented bid request. After the augmented bid request has been formatted, at step M, the data augmenting service system 130 may transmit the standardized, augmented bid request to the real-time impression bidder system 110. Then at step N, the real-time impression bidder system 110 may determine whether to respond to the bid request. At step O, the real-time impression bidder system 110 may respond to the RTBx system 120.

Any of the systems, servers, modules, and/or devices, discussed above may include any type or combination of computing systems, such as handheld devices, personal computers, servers, clustered computing machines, and/or cloud computing systems. In one embodiment, the above-described systems, servers, modules, and devices may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing software. The user interface may include any type or combination of input/output devices, such as a display monitor, touchpad, touchscreen, microphone, camera, keyboard, and/or mouse.

Figure 4:
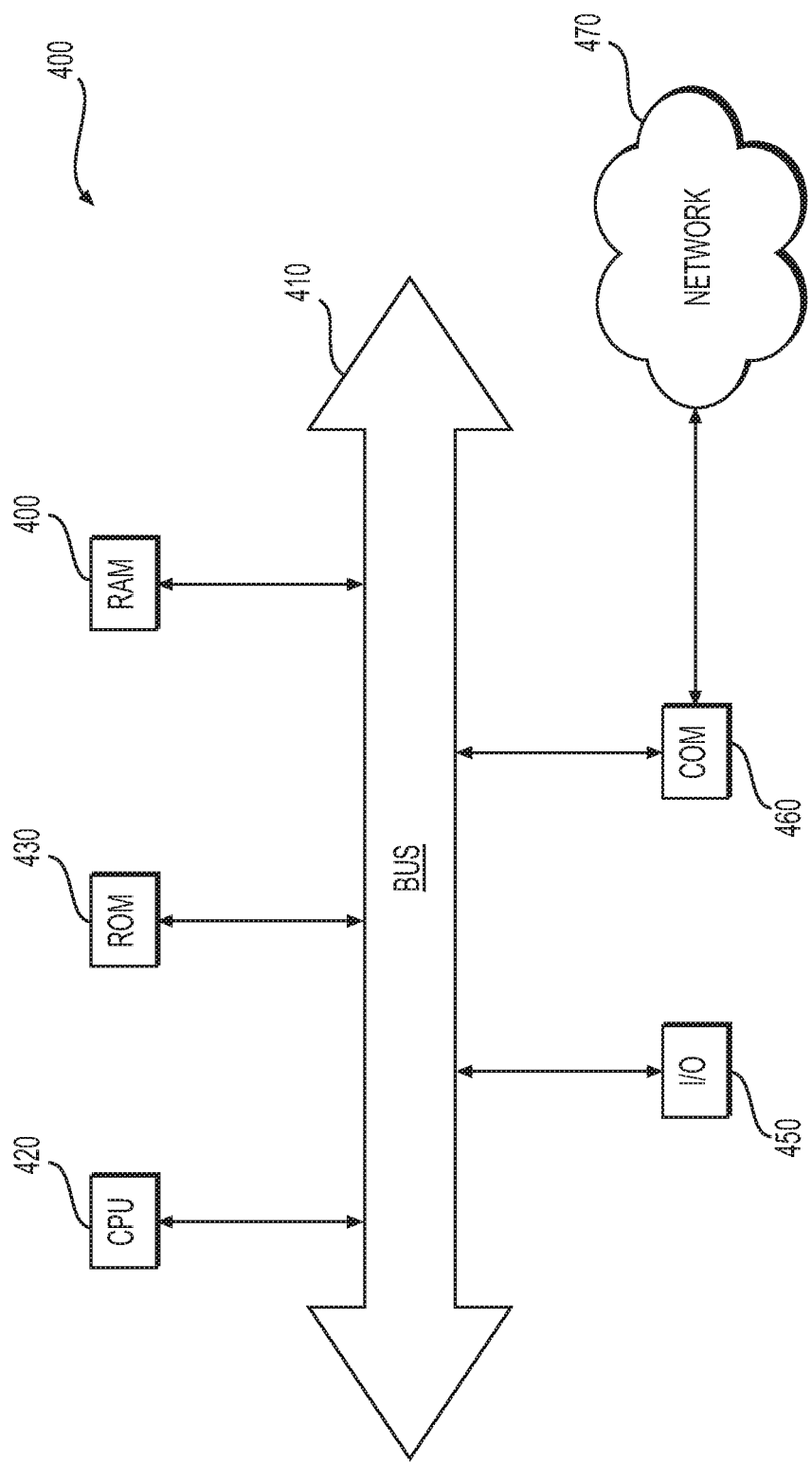
FIG. 4 is a simplified functional block diagram of a computer that may be configured as a device or server for executing the methods of FIGS. 2 and 3, according to exemplary embodiments of the present disclosure.

FIG. 4 is a simplified functional block diagram of a computer that may be configured as a device or server for executing the methods, procedures, policies, and/or calculation discussed in reference to FIGS. 1-3, according to exemplary embodiments of the present disclosure. Specifically, in one embodiment, as shown in FIG. 4, any of the above-described systems, servers, modules, and/or devices may be an assembly of hardware 400 including, for example, a data communication interface 460 for packet data communication. The platform may also include a CPU 420, in the form of one or more processors, for executing program instructions. The platform typically includes an internal communication bus 410, program storage, and data storage for various data files to be processed and/or communicated by the platform such as ROM 430 and RAM 440, although the system 400 often receives programming and data via network communications 470. The server 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, which may be used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to applications and to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for augmenting real-time bidding data with proprietary data, the method including:

receiving, at a server of a data augmenting service, a request from a real-time bidding exchange to augment a bid request with proprietary data, the bid request including a user identifier, the server of the data augmenting service being in electronic communication between the real-time bidding exchange and one or more real-time impression bidders over an electronic communications network;

comparing, by the server, the user identifier against one or more user identifiers stored in a database of the data augmenting service;

based on matching the user identifier with one or more user identifiers stored in the database, determining, by the server, proprietary data to include in an augmented bid request, the proprietary data including user-specific data associated with the user identifier;

generating, by the server, the augmented bid request based on the bid request and the user identifier, the augmented bid request including the proprietary data, the augmented bid request including at least one of demographic information, segment information, and user-specific information;

formatting, by the server, the augmented bid request into a standardized, augmented bid request; and transmitting, by the server over the electronic communications network, the standardized, augmented bid request to the one or more real-time impression bidders.

2. The method of claim 1, further comprising:

receiving, at the server of the data augmenting service, a second request from the real-time bidding exchange to augment a second bid request with proprietary data, the second bid request including a second user identifier;

comparing, by the server, the second user identifier against the one or more user identifiers stored in the database of the data augmenting service;

based on matching the second user identifier with the one or more user identifiers stored in the database, determining, by the server, proprietary data to include in a second augmented bid request, the proprietary data including user-specific data associated with the second user identifier;

formatting, by the server, the second augmented bid request into a second standardized, augmented bid request; and transmitting, by the server over the electronic communications network, the second standardized, augmented bid request to the real-time bidding exchange.

3. The method of claim 2, wherein the steps of receiving, accessing, determining, formatting, and transmitting occur concurrently.

4. The method of claim 2, wherein the steps of receiving, accessing, determining, formatting, and transmitting occur consecutively.

5. The method of claim 2, wherein the second standardized, augmented bid request is used to adjust the bid request by the real-time bidding exchange.

6. The method of claim 1, further comprising:

decrypting, by the server, the bid request for proprietary data; and encrypting, by the server, the standardized, augmented bid request.

7. The method of claim 1, wherein the standardized, augmented bid request is used to determine whether to respond to the bid request by the real-time impression bidder.

8. A system for augmenting real-time bidding data with proprietary data, the system including:

at least one data storage device storing instructions for augmenting real-time bidding data with proprietary data; and at least one processor configured to execute the instructions to perform a method for augmenting real-time bidding data with proprietary data, the method including:

receiving, at a server of a data augmenting service, a request from a real-time bidding exchange to augment a bid request with proprietary data, the bid request including a user identifier, the server of the data augmenting service being in electronic communication between the real-time bidding exchange and one or more real-time impression bidders over an electronic communications network;

comparing, by the server, the user identifier against one or more user identifiers stored in a database of the data augmenting service;

based on matching the user identifier with one or more user identifiers stored in the database, determining, by the server, proprietary data to include in an augmented bid request, the proprietary data including user-specific data associated with the user identifier;

generating, by the server, the augmented bid request based on the bid request and the user identifier, the augmented bid request including the proprietary data, the augmented bid request including at least one of demographic information, segment information, and user-specific information;

formatting, by the server, the augmented bid request into a standardized, augmented bid request; and transmitting, by the server over the electronic communications network, the standardized, augmented bid request to the one or more real-time impression bidders.

9. The system of claim 8, wherein the processor is further configured to execute the instructions to perform the method further including:

receiving, at the server of the data augmenting service, a second request from the real-time bidding exchange to augment a second bid request with proprietary data, the second bid request including a second user identifier;

comparing, by the server, the second user identifier against the one or more user identifiers stored in the database of the data augmenting service;

based on matching the second user identifier with the one or more user identifiers stored in the database, determining, by the server, proprietary data to include in a second augmented bid request, the proprietary data including user-specific data associated with the second user identifier;

formatting, by the server, the second augmented bid request into a second standardized, augmented bid request; and transmitting, by the server over the electronic communications network, the second standardized, augmented bid request to the real-time bidding exchange.

10. The system of claim 9, wherein the steps of receiving, accessing, determining, formatting, and transmitting occur concurrently.

11. The system of claim 9, wherein the steps of receiving, accessing, determining, formatting, and transmitting occur consecutively.

12. The system of claim 8, wherein the standardized, augmented bid request is used to determine whether to respond to the bid request by the real-time impression bidder.

13. The system of claim 8, wherein the processor is further configured to execute the instructions to perform the method further including:
    decrypting the bid request for proprietary data; and
    encrypting the standardized, augmented bid request.

14. The system of claim 9, wherein the second standardized, augmented bid request is used to adjust the bid request by the real-time bidding exchange.

15. A non-transitory computer-readable medium storing instructions that, when executed by a computer, cause the computer to perform a method for augmenting real-time bidding data with proprietary data, the method including:
    receiving, at a server of a data augmenting service, a request from a real-time bidding exchange to augment a bid request with proprietary data, the bid request including a user identifier, the server of the data augmenting service being in electronic communication between the real-time bidding exchange and one or more real-time impression bidders over an electronic communications network;
    comparing, by the server, the user identifier against one or more user identifiers stored in a database of the data augmenting service;
    based on matching the user identifier with one or more user identifiers stored in the database, determining, by the server, proprietary data to include in an augmented bid request, the proprietary data including user-specific data associated with the user identifier;
    generating, by the server, the augmented bid request based on the bid request and the user identifier, the augmented bid request including the proprietary data, the augmented bid request including at least one of demographic information, segment information, and user-specific information;
    formatting, by the server, the augmented bid request into a standardized, augmented bid request; and
    transmitting, by the server over the electronic communications network, the standardized, augmented bid request to the one or more real-time impression bidders.

16. The computer-readable medium of claim 15, further comprising:
    receiving, at the server of the data augmenting service, a second request from the real-time bidding exchange to augment a second bid request with proprietary data, the second bid request including a second user identifier;
    comparing, by the server, the second user identifier against the one or more user identifiers stored in the database of the data augmenting service;
    based on matching the second user identifier with the one or more user identifiers stored in the database, determining, by the server, proprietary data to include in a second augmented bid request, the proprietary data including user-specific data associated with the second user identifier;
    formatting, by the server, the second augmented bid request into a second standardized, augmented bid request; and
    transmitting, by the server over the electronic communications network, the second standardized, augmented bid request to the real-time bidding exchange.

17. The computer-readable medium of claim 16, wherein the steps of receiving, accessing, determining, formatting, and transmitting occur concurrently.

18. The computer-readable medium of claim 16, wherein the steps of receiving, accessing, determining, formatting, and transmitting occur consecutively.

19. The computer-readable medium of claim 16, wherein the second standardized, augmented bid request is used to adjust the bid request by the real-time bidding exchange.

20. The computer-readable medium of claim 15, wherein the standardized, augmented bid request is used to determine whether to respond to the bid request by the real-time impression bidder.

* * * * *